Nov. 3, 1936.                P. LEONI                    2,059,591
            AUTOMATIC VARIABLE GEAR RATIO TRANSMISSION
                    Filed July 11, 1934      5 Sheets-Sheet 2

INVENTOR
PILADE LEONI
BY
Hauff & Warland
ATTORNEY

Nov. 3, 1936.   P. LEONI   2,059,591
AUTOMATIC VARIABLE GEAR RATIO TRANSMISSION
Filed July 11, 1934   5 Sheets-Sheet 4

INVENTOR
PILADE LEONI
BY
Hauff & Warland
ATTORNEY

Patented Nov. 3, 1936

2,059,591

UNITED STATES PATENT OFFICE 2,059,591

AUTOMATIC VARIABLE GEAR RATIO TRANSMISSION

Pilade Leoni, New York, N. Y.

Application July 11, 1934, Serial No. 734,633

12 Claims. (Cl. 74—293)

My invention relates to an automatic variable gear ratio transmission adapted to be interposed between a driving member and a driven member and particularly adapted for use in automobiles.

An object of my invention is to so construct my automatic transmission that the driven member can be maintained at rest while the driving member is in motion and that motion can be imparted to the driven member gradually from rest position to twice the speed of the driving member. The advantage of this construction is that the driven member, the driving member and the gears connecting the driving and driven members will not be subjected to any sudden stresses and that the vehicle to which the transmission is applied will not receive any sudden jolts.

A further object of my invention is the provision of fluid controlled means for adjusting the gear ratio, that is the speed ratio, between the driving member and the driven member and to so construct said adjusting means that the gear ratio will remain constant for a given speed of driving means regardless of the load impressed on the driven member.

An additional object of my invention is to so construct the fluid controlled gear ratio adjustor that the controlling fluid always travels in the same direction and that the velocity of flow of the controlling fluid varies inversely with the speed of the driven member. This construction has the distinct advantages that no energy is wasted in reversing the direction of flow of the controlling fluid and that the danger of subjecting the controlling fluid to excessively high temperatures is practically eliminated.

Another object of my invention is the provision of a device, hereafter called a regulator, operated by the application of pressure to a foot pedal, for correlating the speed of the driving member, the gear ratio and the load on the driven member in such a manner that for a given load on the driven member and a given speed of the driving member, the most advantageous gear ratio between these two members is established.

Still another object of my invention, insofar as it is directed to driving members operated by internal combustion motors, is to provide the regulator with means for adjusting the feed of fuel to the motor with respect to the load impressed on the driven member for a given gear ratio between driving and driven members. In other words, in an automobile according to my invention the feed of gas to the motor is not directly under the control of the operator but is controlled by the load on the car, the speed of the engine and the gear ratio between the driving and driven members.

A still further object of my invention is the provision of a transmission of the character described in which the direction of rotation of the driven member can be reversed without changing the direction of rotation of any of the other moving parts of the transmission.

An additional object of my invention is to so construct the gear ratio adjustor that by rendering inoperative the connection by which the regulator influences the gear ratio adjustor a constant gear ratio between the driving and driven members can be maintained regardless of the speed of the driven member.

In addition to the advantages attending my new transmission listed above, the following advantages may be mentioned.

1. It simplifies control of the operation of an automotive vehicle.
2. It completely eliminates gear shifts and gear levers.
3. It results in far greater overall efficiency than that obtainable in the present day car.
4. It effects a considerable saving of fuel because of most efficient gear ratio at all times.
5. It makes possible the use of a higher gear ratio between driving and driven members.
6. It effects a great saving in wear and tear of mechanical parts in an automobile.
7. It provides for automatic return to starting position whenever pressure on the controlling pedal is released.
8. It provides for free-wheeling at all times and provides means to eliminate free-wheeling when it is not desired.
9. It results in a great saving on tires because of the gradual assuming of traction.
10. It will permit the use of smaller engines without impairing general efficiency of present day cars, while greatly increasing overall efficiency because engine will always be working at the most efficient speed for any given load.
11. It will control engine speed and the most efficient gear ratio at all times, and this without the knowledge or physical effort of the driver who only has to apply pressure to the controlling pedal to produce motion and to increase pressure on the pedal to increase motion up to the limit permitted by the engine full power output.

Further objects and advantages of my invention will appear from the following detailed description of the accompanying drawings in which.

Figure 1:
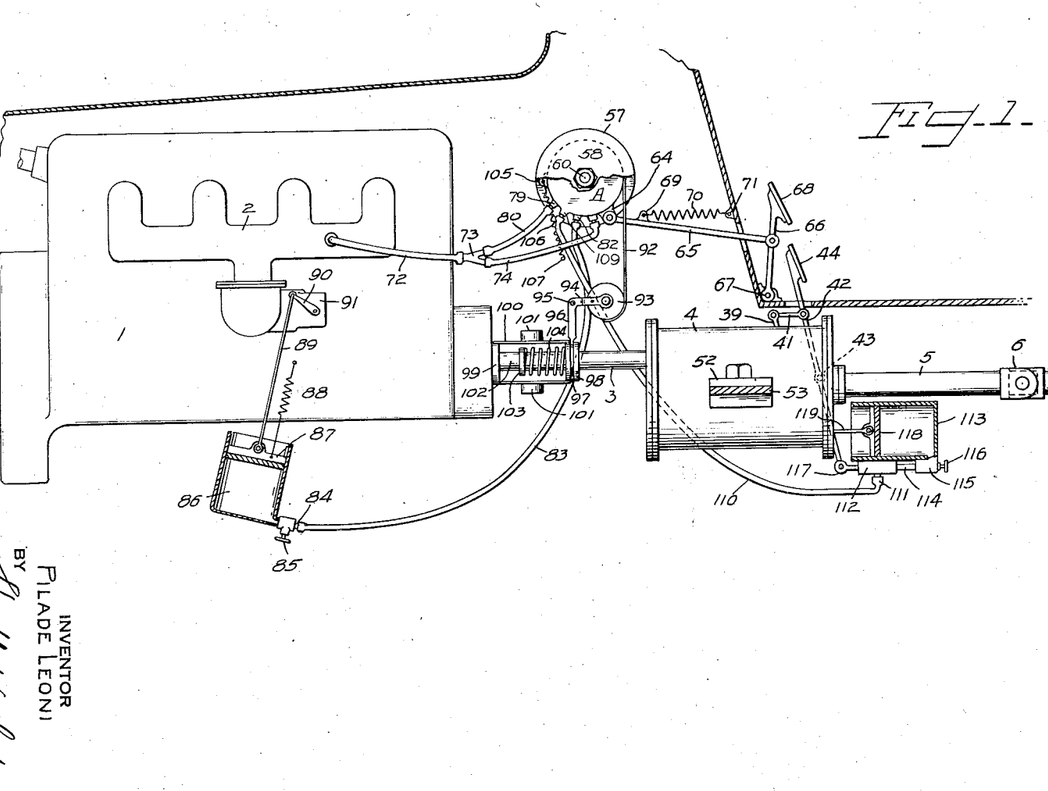
Fig. 1 is a side-elevation of a motor, a driving and a driven member showing one manner in which my control mechanism may be attached thereto.

Referring to the drawings in detail, I represents a motor of conventional design having a manifold 2 and a drive shaft 3. The drive shaft projects into a chamber 4 which houses the transmission gearing according to my invention. Projecting rearwardly from the chamber 4 is a driven shaft 5 extending into the differential (not shown) and provided with a universal joint 6.

Figure 2:
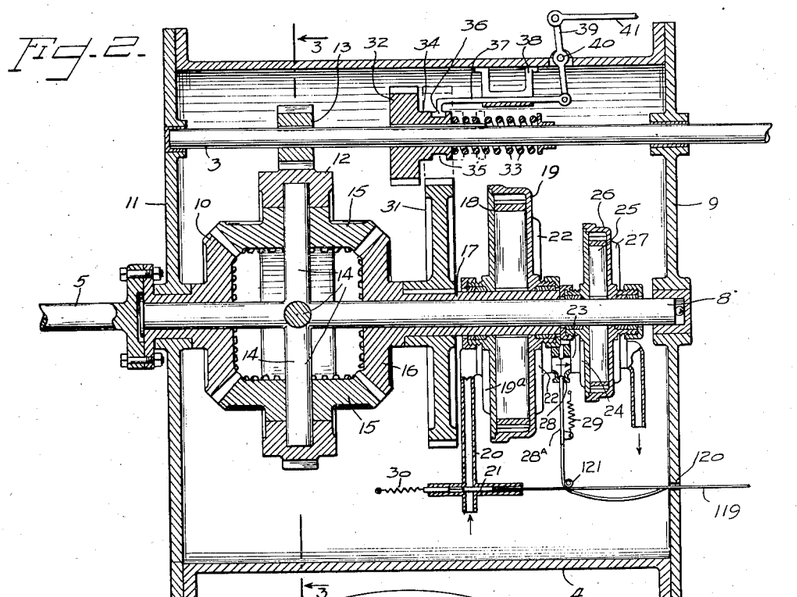
Fig. 2 is a vertical section of my power transmission gearing.
Figure 3:
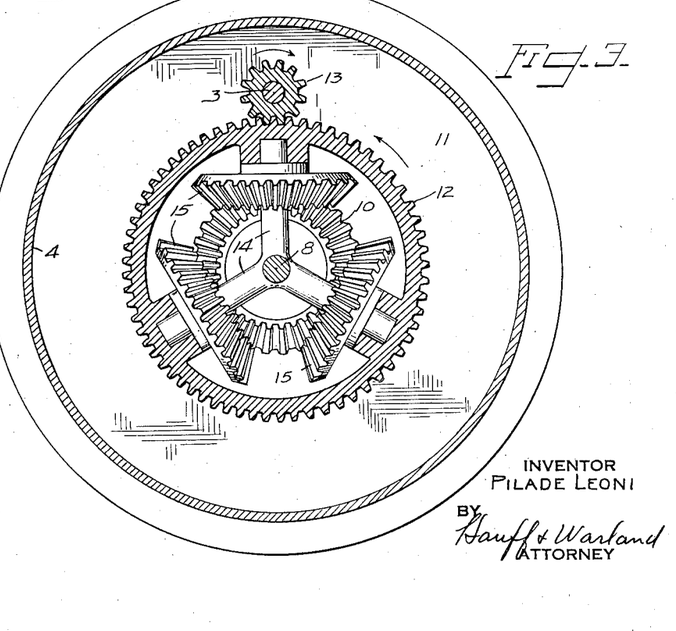
Fig. 3 is a vertical section along the line 3—3 of Fig. 2.

Mounted inside the chamber 4 is a shaft 8 having one of its ends journalled in the end wall 9 of chamber 4 and having its other end journalled in bevel gear 10 which, in turn, is securely keyed to the shaft 5 and is journalled in the other end wall 11 of the chamber 4. Rigidly mounted on the shaft 8 is a gear 12 which is always in mesh with a small gear 13 keyed to the drive shaft 3. Journalled on the spokes 14, which support gear 12 on the shaft 8 are three bevel gears 15 which are always in mesh with gear 10. Loosely mounted on the shaft 8 in such a way as to be always in mesh with bevel gears 15 is a bevel gear 16, identical in size and number of teeth with gear 10 and having a sleeve portion 17 on which is keyed the rotor 18 of a pump, the casing 19 of which is secured to the walls of the chamber 4. The casing is provided with an inlet manifold 19a and an inlet pipe 20 which is controlled by a slide valve 21 which is normally held in closed position by a spring 30, the operation of which will be hereafter described.

Covering the outlet 22 in the pump casing 12 is a manifold 24 which is connected through inlet pipe 23 with the inlet manifold 24 of a smaller pump, the rotor 25 of which is rigidly keyed on the shaft 8 and the casing 26 of which is secured to the walls of the chamber 4. The outlet manifold 27 of the smaller pump opens into the chamber 4 in which a sufficiently high level of fluid is maintained to cause fluid to flow by gravity into the large pump. Instead of being contained in chamber 4, the controlling fluid can be contained in a separate chamber either inside or outside of chamber 4. The fluid connection between manifold 22 of the large pump and the manifold 24 of the small pump is controlled by valve 28 which is normally held in open position by a spring 29 attached to a rod 28a extending from valve 28.

The operation of the transmission thus far described is as follows:

The bevel gear 10 has a normal tendency to resist movement because it is operatively connected with the rear wheels of the car. Therefore, upon the rotation of shaft 8 by shaft 3 through gears 13 and 12, the bevel gears 15 will rotate around the gear 10 and bevel gear 16 will rotate at twice the speed of shaft 8. This condition will prevail so long as no fluid is fed through the pumps and until no more fluid is passed through the large pump than can be taken up by the small pump. As soon, however, as the large pump delivers to the small pump more fluid than the latter can consume, the fluid builds up a resistance against the rotation of the rotor of the large pump which, in turn, being keyed to the sleeve 17, restrains the rotation of gear 16 whereby gear 10 is caused to rotate. If the motion of gear 16 is entirely stopped, gear 10 will be caused to rotate at twice the speed of shaft 8. For every revolution of gear 12, gear 16 or gear 10 or both must rotate. The aggregate sum of their rotations must be two for every rotation of gear 12. Motion lost by either gear 16 or gear 10 must be taken up by the other. Bearing in mind the difference in capacity between the two pumps and the fact that the larger pump normally rotates twice as fast as the smaller pump, it can be readily appreciated that only small quantities of fluid fed into the large pump are sufficient to bring about a retardation of its rotor.

It is particularly important to note that the fluid in the pumps always travels in the same direction so that the loss of energy which accompanies systems of this type in which the direction of flow of the fluid is changed during each cycle is avoided. Of greater importance is the fact that, in contradistinction to systems of this kind in which the rate of flow of the controlling fluid varies directly with the speed imparted to the rear wheels, in my system the rate of flow of the controlling fluid varies inversely with the speed imparted to the rear wheels such that when the rear wheels are travelling at highest speed the controlling fluid is not circulating at all. The obvious advantage of this system is that excessive heating and consequent decomposition of the controlling fluid, if it be oil, are considerably reduced.

Of considerable advantage is the fact that the rate of flow of the fluid flowing through the larger pump's inlet, being variable, can be controlled so as to build a disproportion between the amount of fluid which the larger pump can handle in one revolution, and the amount of fluid which the smaller pump can also handle in one revolution. Also noteworthy is the fact that fluid under pressure in the outlet manifold of the larger pump will transmit pressure through the inlet manifold of the smaller pump to the vanes of said pump in the direction of the rotation of said pump thus preventing loss of energy and effecting an efficient gear ratio control connection. It may also be noted again that the degree of retardation of the rotor of the large pump is controlled by the quantity of fluid the small pump can take up in a single rotation as compared to the amount of oil fed by the large pump in a single rotation and is entirely independent of the pressure exerted on the fluid by the vanes of the large pump.

In order to reverse the direction of the driven member, the gear 31, which is of smaller diameter than gear 12, is keyed to the sleeve 17 and is adapted to mesh with a gear 32 which has a diameter about twice as great as gear 13 and which is slidingly mounted on and keyed for rotation with drive shaft 3. The gear 32 is normally held out of mesh with gear 31 by spring 33. Gear 32 is provided with a collar portion 34 which has a circumferential groove 35 in which rides a block 36 which is integral with a rod 37 slidingly mounted in a bracket 38 and linked with a lever 39 fulcrumed at 40. Lever 39 is in turn linked to a rod 41 which is pivotally connected to a rod 42 fulcrumed at 43 and extending above the footboard of the automobile where it terminates in a foot pedal 44.

The manner in which the above described mechanism effects the reversal of the direction of rotation of the rear wheels is as follows:

It has been shown that when gears 32 and 31 are not in mesh and the rotation of gear 16 is not retarded, gear 16 rotates twice as fast as shaft 8. It also has been shown that when the rotation of gear 16 is retarded, gear 10 begins to rotate in the same direction as gear 16. Since the rotations of gears 16 and 10 must aggregate two for every rotation of gear 12, it follows that, if the rotation of gear 16 is increased beyond twice that of gear 12 or shaft 8, gear 10 will rotate in a direction opposite to gear 16. Since gear 31 is of smaller diameter than gear 12 and gear 32 is of larger diameter than gear 13, gear 32 will impart to gear 16, through gear 31, a rotation more than twice that which is imparted to shaft 8 by gear 13 through gear 12. Therefore when gear 32 is entrained with gear 31, the direction of rotation of gear 10 and, consequently, of the rear wheels of the car will be reversed.

In the above description, for the sake of simplicity, the control pumps 18 and 25 have been referred to only in general terms. Both of the pumps are of the same type and differ only as to size. The large pump is specifically illustrated in Figs. 4 and 5.

Figure 4:
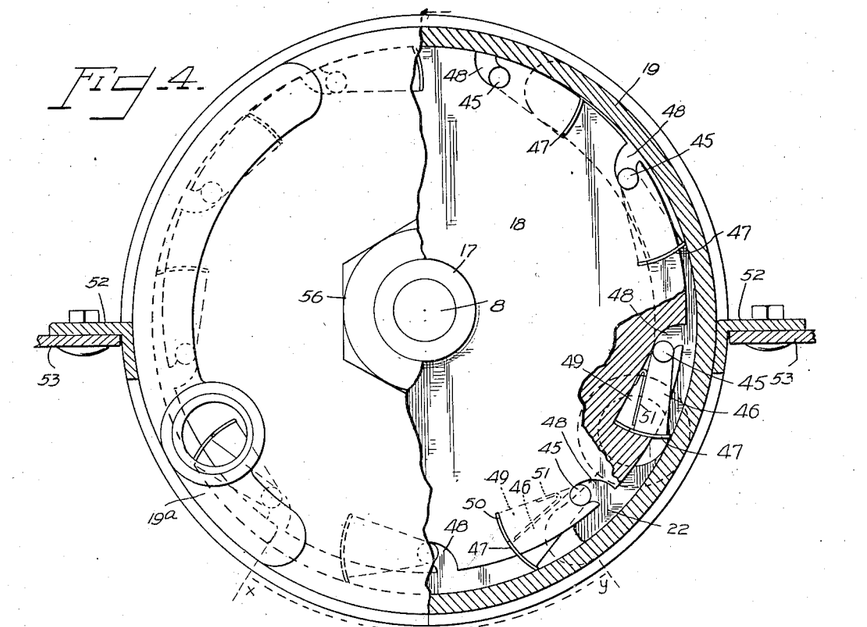
Fig. 4 is an end view of the large control pump with part of the casing broken away.
Figure 5:
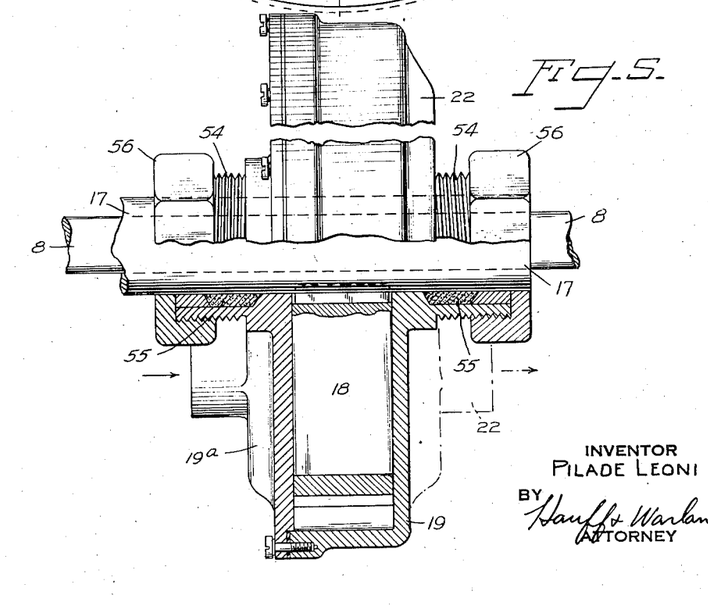
Fig. 5 is a front elevation of the same pump partly in section.

The rotor 18 is mounted eccentrically in the casing 19 so that in one portion of the casing the periphery of the rotor is spaced from the inner periphery of the casing and in another portion the periphery of the rotor is flush against the inner periphery of the casing. The fluid is introduced between the rotor and the casing through manifold 19a and leaves through manifold 22. The space x—y constitutes the working zone of the pump.

Figure 6:
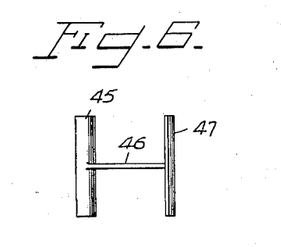
Figs. 6 and 7 are a plan view and side elevation respectively of one of the vanes of the pump.
Figure 7:
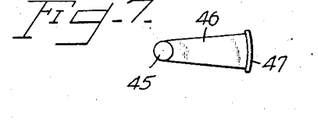
Figure 8:
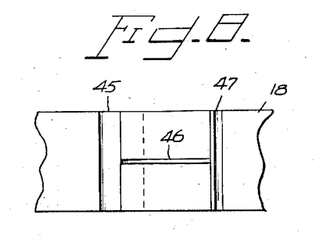
Figs. 8 and 9 are a plan view and a vertical section respectively of a vane in position on the rotor of the pump.
Figure 9:
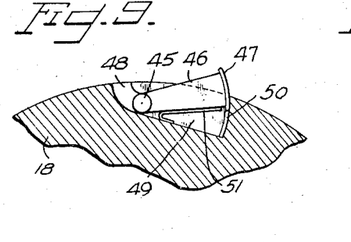

The vanes of the pump, shown in Figs. 6 and 7, each consists of an anchoring bar 45 integrally connected by a member 46 to an arcuate blade 47. The periphery of the rotor is provided with axially disposed arcuate recesses 48, each adapted to receive an anchor bar 45, circumferentially disposed slots 49 each adapted to receive a member 46 and arcuate slots 50, each disposed at right angles to and communicating with a slot 49 and adapted to receive an arcuate blade 47. Each slot 49 is provided with a leaf spring 51 which normally tends to press the arcuate blade contained slot 50 outwardly.

The above described construction has several advantages. The first of these is that in the assembling of the parts it is a simple matter to insert the vanes into their corresponding slots and that, once inserted, they must remain in place so long as the rotor is enclosed in its casing. Another and more important advantage is that because of the arcuate shape of the vanes, they are held against the inner periphery of the casing in the working zone x—y, not only by the pressure of the springs 53 and centrifugal force, but by the pressure of the fluid passing through the pump which tends to impart to the vanes an outward thrust. As can be readily understood, when the outlet port 46 is filled with fluid by reason of the inability of the smaller pump to take it up as fast as it is fed by the larger pump, the fluid will resist the motion of the vanes through the working zone x—y and will therefore retard the rotation of the motor. This retardation will increase directly with the disparity between the consumption of the smaller pump and the feed of the larger pump and will become absolute when the outlet of the larger pump is completely closed.

The outer periphery of the casing 19 carries lugs 52 which are bolted to brackets 53 extending inwardly from the wall of the chamber 4. The end walls of the casing carry threaded collars 54 extending over and spaced from the shaft upon which the rotor is mounted to form packing spaces 55 which are sealed by caps 56 threaded to fit the collars 54.

Since it is an object of my invention to correlate the speed of the engine with the load in such a manner that the maximum work will be done for a given engine speed and that the minimum power will be expended for a given load, I have devised means for simultaneously adjusting the speed of the motor to the degree of retardation of rotor 18 of the large control pump to suit any operating conditions. This means can be so constructed as to perform its function by utilizing the vacuum from the manifold of the engine, vacuum maintained in a separate constant vacuum chamber, pressure from a pump operated by the engine or electricity from a small generator driven by the engine or by batteries. This means has been heretofore referred to as the regulator and in the preferred embodiment shown in the accompanying drawings in Figs. 10 to 13, inclusive, it is so constructed as to utilize the vacuum from the manifold of the engine.

Figure 10:
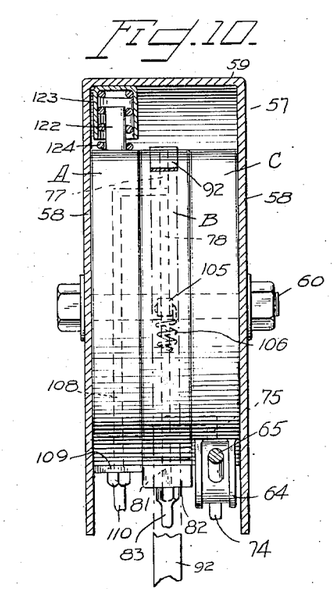
Fig. 10 is a side view with the casing broken away of the regulator.

The regulator consists of a casing 57 secured in a convenient manner and having a pair of circular end walls 58 joined by a semi-cylindrical wall 59. A short shaft 60 journalled in the end walls of the casing carries three discs, A, B, and C. The contacting faces of these discs are smoothly machined and closely fitting so as to be gas tight. If desired, they may be spring pressed together, but not so tightly as to prevent relative motion with respect to each other. Projecting from either side of the disc B is a pin 61 riding in a slot 62 in disc A and a slot 63 in disc C. By this pin and slot arrangement the distance which each disc can move relative to the other discs is restricted for the purpose hereinafter described.

Projecting from disc C is a tab 64 to which is linked a rod 65 which, in turn, is pivoted to a lever 66, which is fulcrumed at 67 and extends upwardly through the footboard of the automobile and terminates in a pedal 68. The rod 65 carries a lug 69 to which is attached a spring 70 anchored at 71. The purpose of the spring is to draw the rod 65 back to starting position when pressure on pedal 68 is released.

A flexible tube 72 is connected to the manifold tube of the engine and terminates in a Y connection 73. A tube 74 connects one arm of the Y to a passage 75 in disc C opening on that face of disc C which is in contact with disc B in the form of a circular opening.

Also in disc C is a passage 76 having one of its ends opening on to the periphery of disc C and the other of its ends opening on to that face of disc C which is in contact with disc B.

Disc B is provided with a passageway 77 opening at one end on to the periphery of disc B and at its other end on to that face of disc B which is in contact with disc A. Disc B is also provided with a passageway 78 having one of its ends opening on to that face of disc B which is in contact with disc A and having its other end terminating in a nipple 79, to which is connected one end of a tube 80, the other end of which is connected to an arm of Y 73. Also in disc B is a passage 81 having one of its ends terminating in that face of disc B which contacts disc C, the opening in the face of disc B thus formed being so positioned as to be capable of registering with the openings formed in the face of disc C by passages 75 and 76, and having its other end terminating in a nipple 82 to which is attached one end of a tube 83. The other end of the tube 83 is attached to the inlet 84, controlled by cock 85, of cylinder 86, in which travels a piston 87 which is normally held in its outermost position by a spring 88. Pivoted on the outer face of piston 87 is a rod 89 having its other end pivotally connected to a link 90 which controls a valve of the butterfly type mounted in the gas feed 91. Instead of the rod and link arrangement in conjunction with the butterfly valve, the rod itself can be the needle of a needle valve acting directly to control the flow of gas to the engine.

Secured to the disc B is one end of a flexible band 92 which passes over the circumference of disc B and has its other end secured to the circumference of circular disc 93 non-rotatably mounted on arm 94 of a bell crank pivoted at 95 and having the end of its other arm 96 projecting into a groove 97 of a collar 98 mounted for rotation with and axial motion along driveshaft 3. Collar 98 is connected to a collar 99 which is keyed to shaft 3 and non-slidable thereon by flexible strips 100, each of which carries a weight 101. Projecting from that face of collar 99 which faces collar 98 is a sleeve 102 having at its outer end a flange 103 between which and collar 98 is a spring 104 which normally presses collar 98 away from collar 99.

Projecting from the periphery disc B is a lug 105 to which is attached a spring 106 anchored at 107. The function of spring 106 is to normally force disc B in a counter-clockwise direction.

The disc A is provided with a passageway 108 terminating at one end upon that face of disc A which is in contact with disc B, the opening in disc A thus formed being so positioned as to be capable of coinciding with either of the openings formed in the face of disc B by passages 77 and 78. The other end of passage 108 terminates in a nipple 109 to which is attached one end of a tube 110, the other end of which is attached to a nipple 111 projecting from the entry port 112 of a cylinder 113. The entry port 112 is connected by a pipe 114 to the inlet 115 of cylinder 113. Inlet 115 is controlled by a cock 116. The inlet port 112 can be completely closed by a slide valve 117 which is controlled by a pedal rod 42. The function of this construction is to permit the pumps 18 and 25 to be maintained in neutral position when pedal 44 is pressed to throw the car into reverse so that the rotation of gear 16 will not be retarded.

Riding in cylinder 113 is a piston 118. Attached to the outer face of the piston is a pair of wires 119 which enter the chamber 4 through an opening 120 and pass over pulley 121 after which they separate. One of the wires is attached to the valve 28 in the inlet port of the small pump and has a certain amount of slack for the purpose hereinafter specified, and the other wire is attached to the valve 21 in the inlet port of the large pump.

On the periphery of disc A is a stud 122 on which is loosely mounted a cap 123 spring pressed against the inner periphery of the semi-cylindrical wall 59 of the casing of the regulator 57 by a spring 124. The purpose of this cap is to create a friction between disc A and the wall 59 whereby disc A can only be moved by the application of a positive force greater than the force of the friction between disc A and disc B.

The provision of cock 85 in the cylinder 86 and cock 116 in cylinder 118 is important. By manipulation of these cocks it is possible to vary the rate at which either one of the cylinders will become evacuated with respect to the other whereby the rate at which the gear ratio builds up can be varied with respect to the rate at which the speed of the engine increases. As will be pointed out hereinafter, as a general thing it is preferable to so adjust these cocks that cylinder 86 becomes evacuated faster than cylinder 113 whereby the engine speed builds up faster than the gear ratio.

Figure 11:
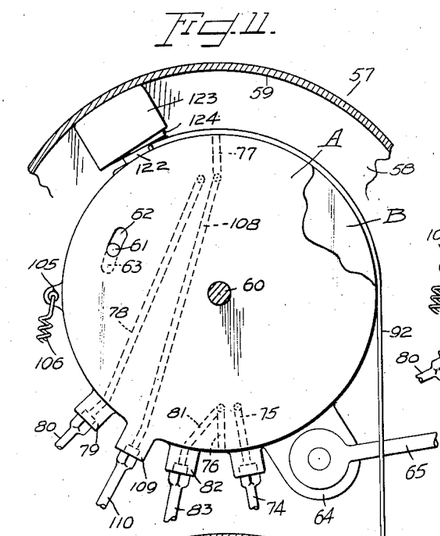
Figs. 11, 12, 13, and 14 are front views of the regulator showing the position of its parts at different points in the operation of the regulator.
Figure 12:
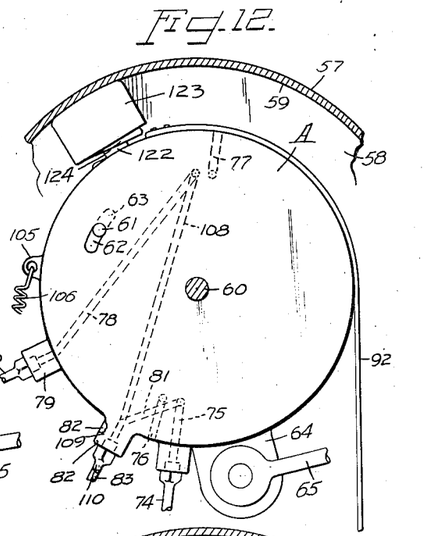

The operation of the regulator can be understood from a consideration of Figs. 11, 12, 13, and 14 taken in conjunction with Figs. 1 and 2. In Fig. 11, the regulator is shown at rest position, in which the passageway in disc B leading to cylinder 86 which controls the gas feed is connected with the air inlet 76 in disc C, the passageway 108 in disc A, which is connected to cylinder 113 which controls the feed of fluid to the control pumps is connected with the air passage 77 in disc B and the passageways 75 and 78 in discs C and B respectively connected with the manifold of the engine are sealed by discs B and A respectively. It may be noted here that when passageway 81 in disc B is connected to air, the piston 87 in cylinder 86 is at its outermost position and the gas inlet valve in gas feed pipe 91 is at idling position; that is, it permits the feed of sufficient gas to the motor to keep it running at idling speed.

It is to be also noted that when passageway 108 in disc A is connected to air passage 77 in disc B, piston 118 in cylinder 113 is in its outermost position, in which position it permits the slide valve 21 in inlet 20 of the large control pump to be held in closed position by the spring 30 and the slide valve 28 in inlet pipe 24 of the small control pump to be held in open position by spring 29.

Let it be assumed that the motor is started in the usual manner and pedal 68 is pressed sufficiently to give any desired speed, of the drive shaft 3, for example, 2000 R. P. M. The force of the pedal 68 through the rod 65 will push disc C in a clockwise direction. Disc C will move along for the length of slot 63. Then the end of slot 63 will abut against the pin 61 and cause disc B to move with disc C for the length of slot 62 when the pin 61 will abut against the end of slot 62 and cause the three discs to move together.

When disc C has moved the distance of slot 63, passageway 75 in disc C connected to the manifold of the engine will be connected with passageway 81 in disc B connected to the gas feed control. At the same time, the air passage 76 in disc C will be moved out of register with passageway 81. As soon as the vacuum is impressed on passageway 81, and, consequently, on cylinder 86, piston 87 will be drawn back against the action of spring 88 and will open the gas feed thus permitting the engine to build up speed and power. During this operation, disc A is held stationary by cap 123.

When discs B and C together travel the length of slot 62, vacuum passage 78 in disc B will be brought into register with passage 108 in disc A leading to the pump control cylinder and air passage 77 in disc B will be moved out of register with passage 108. In this position of the discs (shown in Fig. 12) a vacuum will be impressed on cylinder 113 and cause piston 118 to move inwardly against the action of spring 30 thereby opening the inlet of the large control pump 18—19. Thus the retardation of rotor 18 is begun as hitherto explained. Gear 10 will begin to rotate thereby moving the car forward. If the position of the discs is maintained, piston 118 will continue pulling the controlling wires, take up the slack in the wire attached to valve 28 and draw said valve to stop the flow of fluid from outlet 22 of the large pump into inlet 24 of the small pump. When this passage is closed completely rotor 18 of the large pump will not rotate any more and the gear ratio will be at its maximum value.

It has already been pointed out that the cocks 85 and 116 are so adjusted that vacuum builds up faster in cylinder 86 than in cylinder 113. When the additional fact of the earlier connection of cylinder 86 to vacuum is taken into consideration, it will be appreciated that the speed of the motor builds up more rapidly than does the gear ratio. Consequently, by the time the discs reach the position shown in Fig. 12, the gas feed to the motor is more than sufficient to carry the load at the gear ratio which has been by this time built up by the action of piston 118 and the pumps, at the speed of drive shaft for which the discs are set. This condition brings about the following action.

When the discs were set for a drive shaft speed of 2000 R. P. M. a certain amount of slack was created in flexible band 92. If the speed of the motor and gear ratio increased at the same rate, by the time the motor acquired sufficient speed to drive the load at drive shaft speed of 2000 R. P. M. at the most efficient gear ratio, the slack in member 92 would be just taken up by virtue of the fact that the rotation of shaft 3 would throw out weights 101, draw in collar 98 against the action of spring 104 and cause the bell crank arm 99 to move clockwise. But since the motor travels at a greater speed, as explained above, the slack in member 92 is not only taken up, but through member 92 disc B is drawn in a clockwise direction, pin 61 moving in slot 63 in disc C.

During this motion of disc B, disc A travels with it, because pin 61 is abutting against the clockwise end of slot 62 in disc A, whereby the building up of vacuum in cylinder 113 and consequently the increase in gear ratio through the increase in oil feed to rotor 18 and the resulting retardation of rotor 18 is not interrupted.

The last mentioned motion of disc B has the effect of diminishing the connection between passage 81 in disc B and vacuum passage 75 in disc C. If the overspeed of the motor is sufficiently great this connection may be entirely broken, in which case the motion of piston 87 would stop and the feed of gas to the engine kept constant. In an extreme case, the overspeed of the motor may be sufficiently great to move disc B until passage 81 in disc B is connected with air passage 76 in disc C, in which case the piston 87 moves outwardly by the action of spring 88, thereby decreasing the feed of gas to the motor. This position of the discs is shown in Fig. 13.

Figures 13, 14:
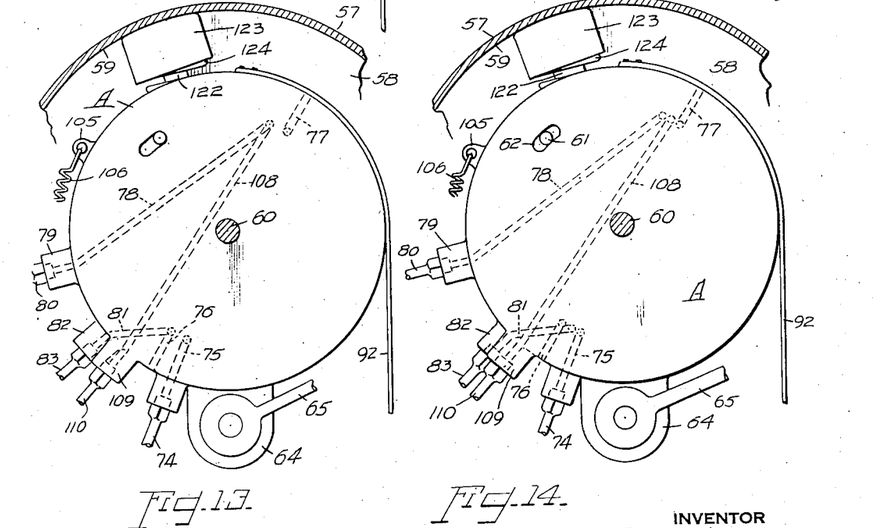

The position shown in Fig. 13 can, of course, be only momentary, if it is reached at all, because, with a constantly increasing gear ratio due to the continued connection of passage 108 with vacuum passage 78 and with a decreasing feed of gas to the motor, the motor immediately slows down, whereupon weights 101 move inwardly, collar 98 moves outwardly, bell crank arm 94 moves counter-clockwise, creating a slack in member 92, and disc B is drawn counter-clockwise by spring 106.

When disc B moves counter-clockwise from the position shown in Fig. 13, pin 61 moves freely in slot 62 in disc A, whereby disc A does not move with disc B by reason of the frictional force of cap 123 against wall 57. The effect of this is to diminish or entirely break the connection between passage 108 in disc A and vacuum passage 78 in disc B thereby either diminishing the rate at which the gear ratio between shafts 3 and 5 is built up through piston 118 and pumps 18 and 25 or stopping the increasing of this gear ratio as the case may be.

If at this time the gear ratio is just correct to enable the engine at the speed it is running to drive the drive shaft 3 at the speed for which the regulator is set, the discs will assume ideal running position (shown in Fig. 14) in which passage 108 in disc A and passage 81 in disc B are both sealed and neither piston 87 nor 118 moves any further.

If the load, gear ratio and engine speed are unbalanced at this point, by reason of the gear ratio having been stepped up too high and the speed of the drive shaft decreased too much, disc B moves counter-clockwise until passage 81 is connected to vacuum passage 75 and passage 108 is connected to air passage 77 in disc B. This results in an inward movement of piston 87 with an increase in gas feed to the engine and an outward movement of piston 118 with a decrease in fluid feed to rotor 18 and a consequent decrease in gear ratio between shafts 3 and 5. The discs will remain in this position until the speed of the engine just begins to exceed that which is necessary to drive the drive shaft 3 at 2000 R. P. M. at the gear ratio established, when, as explained above, the weights 101 cause the disc B to move clockwise to put the discs in the position shown in Fig. 14.

From the above description, it is apparent that upon pressing foot pedal 68 the discs of the regulator will hunt until the position shown in Fig. 14 is reached. This, being the ideal running position, will be maintained until something occurs to disturb the relation between load, gear ratio and speed of engine.

If, with the discs in the position shown in Fig. 14, the load on the motor is suddenly decreased, as by a down grade, the motor will begin to race at the gear ratio obtaining at that time. This will cause disc B to move clockwise, as explained above, and connect passage 81 in disc B with air passage 76 in disc C and connect passage 108 in disc A with vacuum passage 78 in disc B. This will result in a decrease in feed of fuel to the engine and an increase in gear ratio, in the manner heretofore explained, until the speed of the driving member 3 is restored to the selected speed.

On the other hand, if with the discs in the position shown in Fig. 14, the load on the car is suddenly increased, as by an upgrade, the motor speed will diminish, causing weights 101 to move inwardly and disc B to move counterclockwise. This will result in passage 81 in disc B being connected with vacuum passage 75 in disc C and passage 108 in disc A being connected with air passage 77 in disc B. Thereupon, the feed of gas to the engine will increase and the gear ratio will decrease until again the speed of the driving member is restored to the selected 2000 R. P. M.

As can be readily understood from the above discussion, when the regulator is set for any given speed of driving member, the discs will hunt until the proper feed of fuel to the engine and the proper gear ratio to permit the driving member to rotate at the selected speed are obtained. This all occurs without any conscious effort on the part of the operator who merely presses pedal 68 to a position at which the desired speed of driving member is obtained. It follows that to change the speed the operator need only vary the position of pedal 68 and the discs will adjust themselves.

As can be readily understood from the above description, the foot pedal 68 is maintained under pressure of the foot while the car is in motion. In order to stop the car, foot pedal 68 is released, whereupon spring 70 draws rod 65 back to rest position, thereby turning disc C counter-clockwise. From the position shown in Fig. 14, disc B does not move with disc C until the clockwise end of slot 63 abuts pin 61. This motion of disc C connects passage 81 in disc B with air passage 76 in disc C, thereby closing the butterfly valve which feeds the gas through feed pipe 91 in the manner explained above. Through the consequent drop in speed of the motor bell crank arm 94 is moved counter-clockwise, creating a slack in member 92, thereby permitting spring 106 to turn disc B counter-clockwise together with disc C. When discs B and C have moved until the counter-clockwise end of slot 62 abuts pin 61 passage 108 in disc A is connected with air passage 77 in disc B thereby causing piston 118 to completely open outlet 22 and close inlet port 20 in the large control pump and completely eliminate any retardation of rotor 18. This results in bevel gear 10 stopping, whereupon all force against the action of conventional brakes is eliminated.

In order to provide for the testing of the motor for repair work without unnecessarily causing motion of the various parts of my transmission system, I may arrange between the drive shaft 3 and the motor 1 a clutch of any conventional design which may be shifted in and out of engagement by a suitable foot pedal. It is to be understood that in the normal operation of a vehicle equipped with my transmission, the clutch, if present, is always in engagement.

I wish it to be understood that each of the various types of mechanical elements described in the foregoing and illustrated in the drawings for performing certain functions can be replaced by any one of several equivalent mechanical elements for performing the same function. For example, the discs of the regulator can be replaced by sectors or by concentric sleeves. Likewise, the governor mechanism for regulating the movement of disc B by the speed of the engine can be replaced by any one of innumerable governor mechanisms capable of performing the same function. In addition, the slide valve 117 need not be attached to lever 42, but can be operated by a separate foot lever, whereby cylinder 113 can be completely sealed against the action of the regulator and any desired gear ratio can be maintained constantly. It is also to be understood that the arrangement of parts shown in the drawings can be varied in a great number of ways without departing from the scope of my invention.

As employed hereinbefore and in the appended claims, "gear ratio" is intended to mean the ratio between the speed of the driving member and the speed of the driven member. It is not intended by this expression to restrict my invention to a transmission in which power is transmitted from a driving member to a driven member through the medium of gears, since it is apparent that my invention is applicable to any other type of conventional power transmission such as friction transmission.

Having thus described the nature and objects of my invention and a preferred embodiment of the same, which embodiment is to be taken as illustrative rather than limitative, what I now claim as new and desire to secure by Letters Patent is:

1. In a variable gear ratio transmission, in combination, a driving member, a driven member, a gear on said driving member, a gear in mesh with the gear on said driving member mounted on a shaft, a plurality of planetary gears on said second mentioned gear, a pair of oppositely disposed identical gears in mesh with said planetary gears, one of said gears being fixed on said driven member and the other gear being loosely mounted on the shaft of said second mentioned gear, a gear mounted for rotation with said loosely mounted gear and being of larger diameter than said loosely mounted gear but of smaller diameter than said second mentioned gear and a second gear mounted on said driving member and adapted to be moved into mesh with the gear mounted for rotation with said loosely mounted gear, said second gear on the driving member being of larger diameter than the first mentioned gear on the driving member.

2. In a variable gear ratio transmission, in combination, an internal combustion motor provided with a fuel feed pipe, a valve in said pipe, a piston adapted to open said valve upon a variation of the pressure on the working face of said piston, a driven member connected to said motor, means controlled by the flow of fluid for varying the gear ratio between said members, a valve for controlling the flow of fluid and a piston adapted to vary the position of said valve upon a variation in pressure on the working face of said piston, a regulator comprising a plurality of moving parts, two of said parts being provided with means which are adapted to cooperate to vary the pressure on the working face of the piston controlling the fuel feed valve and to thereby control the position of the fuel feed valve and another two of said parts being provided with means adapted to cooperate to vary the pressure on the working face of the piston controlling the valve for the gear ratio control fluid and to thereby control the position of said valve, a foot pedal for setting said parts in starting position in which both valves are open and means operated by the speed of the driving member for varying the position of said parts to suitably vary the opening and closing of said valves to accommodate the gear ratio to the speed of the motor and the load on the driven member.

3. In a variable gear ratio transmission according to the preceding claim in which the moving parts of the regulator comprise three discs mounted with their faces in frictional engagement on a shaft, the first of said discs having a pair of openings on its inner face, one of which is connected to air and the other of which is connected to the manifold of the motor, the second of said discs having an opening arranged in that face which contacts the first disc so as to coincide with either of the openings of the first disc and connected to a cylinder in which the piston controlling the fuel feed valve rides and having a pair of openings on its other face, one of which is connected to air and the other of which is connected to the manifold of the motor, and the third of said discs having an opening arranged on that face which contacts the second disc so as to coincide with either of the openings on the contacting face of the second disc and connected to a cylinder in which the piston which controls the gear ratio controlling fluid rides, a foot pedal for setting said discs in starting position in which the fuel feed opening in the second disc coincides with the air opening in the first disc and the control fluid feed opening in the third disc coincides with the air opening in the second disc, means operated by the speed of the driving member for varying the position of said discs to suitably align said openings to adjust the flow of fluid in the gear ratio varying means to the feed of fuel to the motor for changing conditions of load on the driven member, means for restricting the motion of said discs with respect to each other and means on said third disc to prevent it from moving with said second disc by virtue of frictional engagement.

4. In a variable gear ratio transmission, in combination, an internal combustion motor, a driving member connected to said motor a driven member, a gear on said driving member, a gear in mesh with the gear on said driving member mounted on a shaft, a plurality of planetary gears on said second mentioned gear, a pair of oppositely disposed identical gears in mesh with said planetary gears, one of said gears being fixed on said driven member and the other gear being rotatably connected with the rotor of a pump, a second pump smaller than the first and having its inlet connected with the outlet of the first and having its rotor mounted on the shaft of the gear in mesh with the gear on the driving member, whereby the movement of the rotor of the first mentioned pump is restricted by the capacity of the second pump irrespective of the pressure exerted by the first mentioned pump, a valve for controlling the feed of fluid to the first mentioned pump, a piston, connected to said valve, mounted in a cylinder and adapted, upon movement, to control the opening of said valve, a pipe for feeding fuel to the motor, a valve in said pipe, a piston, connected to said valve, mounted in a cylinder and adapted on movement, to control the opening of said valve, and a regulator comprising three discs mounted in frictional engagement with each other on a shaft, the first disc having openings connected to air and to the vacuum of the motor, the second disc having openings connected to air and to the vacuum of the motor and another opening adapted to register with the openings in the first disc and connected by a passage to the cylinder in which the piston connected to the fuel feed rides, an opening in the third disc adapted to register with the two first mentioned openings in the second disc and connected by a passage to the cylinder in which the piston connected to the valve controlling the feed of fluid to the large pump rides, a food pedal for setting the position of the first disc, means on the driving member for adjusting the position of the second disc, and means for restricting the motion of the three discs with respect to each other whereby, upon the application of pressure to the foot pedal, the discs are caused to move to a position with respect to each other where the most efficient gear ratio between the driving and driven members for a given engine speed and load is established.

5. A transmission assembly comprising a driving member connected to a source of energy, a driven member, fluid-controlled gear ratio changing mechanism between and operatively connected to said members, means operatively connected to said source of energy and to said gear ratio changing mechanism for setting up a gear ratio between the driving and driven members, whereby, under a given load, the driving member, when set at a selected speed, will drive the driven member at a given speed and a change of load on the driven member will cause the driving member to tend to deviate from the selected speed, additional means for setting the speed at which the driving member is to be actuated by the source of energy, and other means, operated by a deviation of the driving member from the selected speed, to restore the driving member to the selected speed.

6. A transmission assembly according to the preceding claim in which said other means includes means operated by a deviation of the driving member from the selected speed to cause the gear ratio changing mechanism to accommodate the gear ratio to the load to permit the maintenance of the selected speed of the driving member.

7. A transmission assembly comprising a driving member connected to a source of energy to which is fed a fuel for developing energy, a driven member, gear ratio changing mechanism between and operatively connected to said members and a control device comprising three elements capable of movement relative to each other, means adjustable by the operator for regulating the position of the first of said elements, means operated by the speed of the motor for regulating the position of the second of said elements and means interconnecting said elements whereby the position of the third element is regulated by the movement of the other two elements, means operatively connecting the second of said elements to the feed line of the fuel for the source of energy and means operatively connecting the third of said elements to the gear ratio changing mechanism, the position of the first of said elements determining the speed at which the driving member is to be actuated by the source of energy, the position of the second of said elements determining the amount of energy supplied by the source of energy for maintaining the driving member at the speed determined by the first element and the position of the third element determining the gear ratio which will enable the driving member to move at the selected speed.

8. A transmission assembly according to claim 5 in which the gear ratio changing mechanism comprises a pair of gears, the rotation of one of which depends on the rotation of the other, one of said gears being fixed to the driven member, and fluid controlled means for regulating the rotation of the other gear and thereby regulating the rotation of the gear fixed to the driven member comprising a pair of pumps, a large pump and a small pump, the inlet of the small pump being connected to the outlet of the large pump, the rotor of the small pump being driven by the driving member, and the rotor of the large pump being mounted to rotate with the gear, the rotation of which it controls.

9. A transmission assembly comprising a driving member connected to a source of energy, a driven member, gear ratio changing mechanism between and operatively connected to said members, means for setting the speed at which it is desired to have the driving member actuated by the source of energy, other means for controlling the energy developed by said source of energy and additional means operatively connected to the gear ratio changing mechanism and to said second mentioned means for automatically and simultaneously correlating the gear ratio between the driving and driven members to the power developed by the source of energy for the maintenance of the speed of the driving member, set by said first mentioned means, under changing conditions of load.

10. A transmission assembly comprising a driving member connected to a source of energy, a driven member, power transmission means connecting said members comprising a pair of gears, the rotation of one of which depends on the rotation of the other, one of said gears being fixed to the driven member, the other gear being freely mounted, a pump having its rotor mounted for rotation with said freely mounted gear, a smaller pump having its rotor mounted for rotation by the driving member, the outlet of the first pump being connected to the inlet of the smaller pump whereby, when the first pump delivers a greater amount of fluid in a single rotation than can be consumed by the smaller pump in a single rotation, the rotation of the rotor of the large pump is retarded, and means for regulating the degree of retardation of rotation of the rotor of the larger pump comprising means for adjusting the feed of fluid to the larger pump.

11. A transmission assembly comprising a driving member connected to an internal combustion motor, a driven member gear ratio adjusting means between said members operated by the flow of a fluid, means for setting the speed at which the driving member is to be actuated by the motor, other means for automatically setting up a gear ratio between the driving member and the driven member, additional means for measuring the feed of the fuel to the motor, a device for measuring the flow of the fluid in the gear ratio adjusting means, further means, actuated by a deviation of speed of the driving member resulting from a change of load on the driven member, for regulating the measuring means controlling the feed of fuel to the motor, and separate means actuated by the deviation of the driving member from the selected speed for regulating the device controlling the flow of fluid in the gear ratio adjusting means to thereby change the aforesaid gear ratio to one which will enable the driving member to travel at the selected speed under the changed load on the driven member.

12. A transmission assembly comprising a driving member connected to a source of energy, a driven member, a gear ratio changing mechanism between and operatively connected to said members, means operatively connected to said source of energy and to said gear ratio changing mechanism for setting up a gear ratio between the driving and driven members, whereby under a given load the driving member, when set at a selected speed, will drive the driven member at a given speed and a change of load on the driven member will cause the driving member to tend to deviate from the selected speed, additional means for setting the speed at which the driving member is to be actuated by the source of energy, other means, operated by the deviation of the driving member from the selected speed, to restore the driving member to the selected speed, further means operated by a deviation of the driving member from the selected speed to cause the gear ratio changing mechanism to accommodate the gear ratio to the load and to the selected speed to permit the maintenance of the selected speed of the driving member, and separate means for adjusting the response of the means for restoring the driving member to the selected speed and of the means for varying the gear ratio between the driving and driven members to a deviation of the driving member from the selected speed whereby one of said means can be made to respond to said deviation quicker than the other.

PILADE LEONI.